United States Patent [19]

Biletch et al.

[11] Patent Number: 4,680,337

[45] Date of Patent: Jul. 14, 1987

[54] TRANSPARENT IMPACT POLYMERS

[75] Inventors: Harry A. Biletch, Lexington; Richard A. Di Manno; Robert J. Gorka, both of Leominster, all of Mass.

[73] Assignee: Polysar Financial Services S.A., Fribourg, Switzerland

[21] Appl. No.: 812,375

[22] Filed: Dec. 23, 1985

[51] Int. Cl.$^4$ .................................... C08F 287/00
[52] U.S. Cl. ...................... 525/53; 524/529; 524/533; 525/310
[58] Field of Search ............... 525/53, 310; 524/529, 524/533

[56] References Cited

U.S. PATENT DOCUMENTS

| | | |
|---|---|---|
| 3,400,175 | 9/1968 | Finestone et al. . |
| 3,883,464 | 5/1975 | Higuchi et al. . |
| 3,903,202 | 9/1975 | Carter et al. ............... 525/53 |
| 4,080,406 | 3/1978 | Kelsey . |
| 4,100,227 | 7/1978 | Bredeweg et al. . |
| 4,100,228 | 7/1978 | Dennis et al. . |
| 4,115,478 | 9/1978 | Alsberg et al. . |
| 4,598,123 | 7/1986 | Cutter ........................ 525/310 |

Primary Examiner—Wilbert J. Briggs, Sr.
Attorney, Agent, or Firm—Stevens, Davis, Miller & Mosher

[57] ABSTRACT

A thermoplastic polymer comprising a styrenic monomer, an acrylate, a methacrylate and a block copolymer is provided which possesses an unexpected excellent balance of properties including good physical properties, good elongation and a high degree of transparency. Also provided are processes for the preparation of the thermoplastic polymer.

8 Claims, No Drawings

TRANSPARENT IMPACT POLYMERS

BACKGROUND OF THE INVENTION

This invention is directed to a product and to a process for the production of said product, wherein said product is an essentially transparent thermoplastic polymer having good toughness, which thermoplastic polymer comprises styrene, an acrylate, a methacrylate and a rubbery block polymer.

DESCRIPTION OF THE PRIOR ART

U.S. Pat. No. 3,400,175 describes a transparent thermoplastic composition consisting of at least one monoalkenyl aromatic hydrocarbon monomer (e.g. styrene), at least one of methacrylic acid esters of $C_1$-$C_8$ alcohols or itaconic acid esters of $C_1$-$C_6$ alcohols or acrylonitrile, a vinyl ester of a saturated monocarboxylic acid (e.g. vinyl stearate), and a rubbery polymer of a conjugated diolefin. U.S. Pat. No. 3,883,464 describes styrene resins (e.g. styrene-acrylonitrile and styrene-acrylonitrile-butadiene resins) containing epoxy lubricants. U.S. Pat. No. 3,922,321 teaches a transparent impact resin produced by mixing a polymer containing methyl methacrylate with a graft copolymer which is obtained by polymerizing an alkyl methacrylate, a vinyl monomer and a crosslinking monomer onto a polymer which contains an alkyl acrylate, styrene and butadiene. U.S. Pat. No. 4,080,406 describes polymers having optical transparency, impact strength and good heat distortion properties which contain a vinyl aromatic monomer (e.g. styrene), methyl or ethyl methacrylate and a $C_4$-$C_{12}$ alkyl methacrylate polymerized in the presence of a butadiene-styrene block copolymer. U.S. Pat. No. 4,100,227 teaches a transparent impact-resistant polymer prepared by the process of polymerizing a mixture containing a rubbery conjugated diolefin polymer, a bromine-containing compound and styrene. U.S. Pat. No. 4,100,228 teaches similarly to U.S. Pat. No. 4,100,227 except that the styrene is replaced by a mixture of styrene and methyl methacrylate. U.S. Pat. No. 4,115,478 describes a two step process for making transparent impact polymers by firstly suspension polymerizing an acrylic monomer, styrene and a butadiene-styrene block copolymer and secondly polymerizing onto the first formed polymer further quantities of styrene and the acrylic monomer.

SUMMARY OF THE INVENTION

A process is provided for the preparation of a thermoplastic composition having good toughness and strength properties and a high degree of transparency, which process comprises the steps of providing a feed mixture comprising monomer (a) being from about 25 to about 75 parts by weight of a styrenic monomer selected from the group consisting of styrene, p-methyl styrene, tertiary butyl styrene, dimethyl styrene, and the nuclear brominated or chlorinated derivatives thereof, monomer (b) being from about 7 to about 30 parts by weight of butyl acrylate, monomer (c) being from about 10 to about 50 parts by weight of methyl methacrylate and a block copolymer being from about 2 to about 20 parts by weight of said block copolymer selected from the group consisting of diblock and triblock copolymers of styrene-butadiene, styrene-butadiene-styrene, styrene-isoprene, styrene-isoprene-styrene, partially hydrogenated styrene-butadiene-styrene and partially hydrogenated styrene-isoprene-styrene linear or radial block copolymers having a molecular weight of not less than about 75,000, for a total of 100 parts by weight of said feed mixture, subjecting such feed mixture to polymerization in (i) an agitated reaction vessel at about 80° to about 100° C. for a time of from about 3 to about 6 hours and (ii) at least one and up to five further reaction vessels in series at about 100° to about 160° C. for a time of from about 2 to about 6 hours such that from about 60 to about 90 weight percent of the polymerizable monomers have been polymerized, passing the so-polymerized mixture to a devolatilization system comprising a devolatilization pre-heating means and a devolatilization vessel to remove unpolymerized monomers, to yield a thermoplastic composition.

Further, a process is provided for the preparation of a thermoplastic composition having good toughness and strength properties and a high degree of transparency, which process comprises the steps of providing a feed mixture comprising monomer (a) being from about 25 to about 75 parts by weight of a styrenic monomer selected from the group consisting of styrene, p-methyl styrene, tertiary butyl styrene, dimethyl styrene, and the nuclear brominated or chlorinated derivatives thereof, monomer (b) being from about 7 to about 30 parts by weight of butyl acrylate, monomer (c) being from about 10 to about 50 parts by weight of methyl methacrylate and a block copolymer being from about 2 to about 20 parts by weight of said block copolymer selected from the group consisting of diblock and triblock copolymers of styrene-butadiene, styrene-butadiene-styrene, styrene-isoprene, styrene-isoprene-styrene, partially hydrogenated styrene-butadiene-styrene and partially hydrogenated styrene-isoprene-styrene linear or radial block copolymers having a molecular weight of not less than about 75,000, for a total of 100 parts by weight of said feed mixture, (i) subjecting said feed mixture to polymerization in an agitated reaction vessel at from about 75° to about 95° C. for a time of from about 2 to about 7 hours for a conversion of from about 15 to about 35 weight percent of the polymerizable monomers, (ii) suspending the so-formed mixture in water in the presence of a suspending agent, and adding peroxidic and/or perester catalyst, and (iii) polymerizing the suspended mixture with agitation in at least two steps, a first step being at a temperature of from about 80° to about 100° C. for a time of from about 2 to about 5 hours and an at least second step being at a temperature of from about 105° to about 130° C. for a time of from about 2 to about 6 hours such that at least 99 weight percent of the polymerizable monomers have been polymerized, separating the so-formed polymer from the water phase, drying the polymer to remove residual water and devolatilizing the polymer to remove residual monomers to yield a thermoplastic composition.

Still further, there is provided a thermoplastic composition having good toughness and strength properties and a high degree of transparency which comprises for a total of 100 parts by weight:

(a) from about 25 to about 75 parts by weight of a styrenic monomer selected from the group consisting of styrene, p-methyl styrene, tertiary butyl styrene, dimethyl styrene, and the nuclear brominated or chlorinated derivatives thereof, (b) from about 7 to about 30 parts by weight of butyl acrylate, (c) from about 10 to about 50 parts by weight of methyl methacrylate, and (d) from about 2 to about 20 parts by weight of a block copolymer selected from the group consisting of diblock and triblock copolymers of styrene-butadiene, styrene-butadiene-styrene, styrene-isoprene, styrene-isoprene-styrene, partially hydrogenated styrene-butadiene-styrene and partially hydrogenated styrene-isoprene-styrene linear or radial block copolymers having a molecular weight of not less than about 75,000.

DETAILED DESCRIPTION OF THE INVENTION

The monomers of the feed mixture of this invention are selected from three specific types and may include a fourth type. Monomer (a) is a styrenic monomer selected from the group consisting of styrene, p-methyl styrene, tertiary butyl styrene, dimethyl styrene, and the nuclear brominated or chlorinated derivatives thereof, and is preferably styrene, the amount of which is, based on 100 parts by weight of the feed mixture, from about 25 to about 75, preferably from about 35 to about 65 and most preferably from about 40 to about 60, parts by weight. Monomer (b) is butyl acrylate in an amount of, based on 100 parts by weight of the feed mixture, from about 7 to about 30, preferably from about 8 to about 20 and most preferably from about 8 to about 15, parts by weight. Monomer (c) is methyl methacrylate in an amount of, based on 100 parts by weight of the feed mixture, from about 10 to about 50, preferably from about 15 to about 40 and most preferably from about 20 to about 40, parts by weight. Small amounts of a fourth monomer, to act as a branching agent, such as polyethylene glycol dimethacrylate may be present in amounts from 0 up to about 0.075 parts by weight per 100 parts by weight of the feed mixture.

The other component of the feed mixture is a block copolymer. The block copolymer is selected from the group consisting of diblock and triblock copolymers of styrene-butadiene, styrene-butadiene-styrene, styrene-isoprene, styrene-isoprene-styrene, partially hydrogenated styrene-butadiene-styrene and partially hydrogenated styrene-isoprene-styrene linear or radial block copolymers having a molecular weight of not less than about 75,000. By partially hydrogenated block copolymers is meant block copolymers in which the butadiene or isoprene portion has been hydrogenated such that from about 5, preferably from about 30, weight percent to about 90, preferably to about 70, weight percent of the butadiene or isoprene portion has been hydrogenated. Preferred among the block copolymers are the triblock styrene-butadiene-styrene and styrene-isoprene-styrene block copolymers with the styrene-butadiene-styrene block copolymers being most preferred. All such block copolymers are well known. The styrene content of the block copolymers will preferably be from about 20 to about 50 weight percent. The molecular weight ($M_w$) of the block copolymer is not less than about 75,000 and preferably not less than about 175,000 and not more than about 275,000. The amount of block copolymer will be from about 2, preferably from about 4, up to about 20, preferably to about 12, parts by weight per 100 parts by weight of the feed mixture.

Thus the feed mixture comprises the monomers and the block copolymer to a total of 100 parts by weight. The feed mixture may also contain one or more organic free radical peroxide, hydroperoxide or perester catalyst sources, small amounts of one or more antioxidants, minor amounts of typical mercaptan chain transfer agents such as dodecyl mercaptan, minor proportions of reaction diluents and minor proportions of processing aids such as stearic acid or zinc stearate. Organic free radical catalyst sources may include one or more of the well known organic peroxides, hydroperoxides or peresters such as, but not limited to, benzoyl peroxide, dicumyl peroxide, lauroyl peroxide, t-butyl hydroperoxide and t-butyl perbenzoate. Suitable reaction diluents include inert hydrocarbons such as ethyl benzene, ethyl toluene, toluene, xylene or butyl benzyl phthalate in amounts up to about 5 parts by weight based on 100 parts by weight of the feed mixture.

The polymer of this invention is a thermoplastic composition having good toughness and strength properties and a high degree of transparency which comprises, for a total of 100 parts by weight, (a) from about 25 to about 75, preferably from about 35 to about 65, parts by weight of a styrenic monomer selected from the group consisting of styrene, p-methyl styrene, tertiary butyl styrene, dimethyl styrene, and the nuclear brominated or chlorinated derivatives thereof, and preferably styrene, (b) from about 7 to about 30, preferably from about 8 to about 20, parts by weight of butyl acrylate, (c) from about 10 to about 50, preferably from about 20 to about 40, parts by weight of methyl methacrylate, and (d) from about 2 to about 20, preferably from about 4 to about 12, parts by weight of a block copolymer selected from the group consisting of diblock and triblock copolymers of styrene-butadiene, styrene-butadiene-styrene, styrene-isoprene, styrene-isoprene-styrene, partially hydrogenated styrene-butadiene-styrene and partially hydrogenated styrene-isoprene-styrene linear or radial block copolymers having a molecular weight of not less than about 75,000, and preferably styrene-butadiene-styrene and styrene-isoprene-styrene block copolymers.

The polymerization of the feed mixture yields a polymer product which has a composition which differs little from that of the feed mixture and the polymer contains a portion of the whole as gel (i.e. insoluble polymer) which contains at least a portion and preferably essentially all of the block copolymer having the monomers grafted thereto. In general, the percent gel in the product is usually from about 8 to about 30 weight percent of the total product and is usually from about 1.5 to about 4 times the weight of block copolymer in the product. The combination of product toughness and product clarity appear to be achieved as a result of the presence of the block copolymer having the monomers grafted thereto.

The process of preparing the thermoplastic composition comprises subjecting the feed mixture to polymerization. Such polymerization may be all bulk or may be a combination of bulk and suspension polymerization.

One process of preparing the thermoplastic composition is a bulk process wherein the feed mixture is fed to an agitated reaction vessel maintained at a temperature of from about 80° to about 100° C. for a time of from about 3 to about 6 hours. At this stage, the polymerization leads to some grafting of the monomers to the block copolymer thereby developing small domains of block copolymer having monomers grafted thereto distributed through the matrix of polymerizing and polymerized monomers. The mixture from this reaction vessel is then passed to at least one and up to five reaction vessels in series, which preferably but not necessarily are equipped with agitation means, preferably there being at least two and most preferably three such reaction vessels in series. These reaction vessels are maintained at temperatures within the range of from about 100° to about 160° C. Preferably the first reaction vessel of a series of two or three reactors will be at a temperature of from about 105° to about 120° C., the second reaction vessel of a series of two reactors will be at a temperature of from about 125° to about 150° C. or the second reaction vessel of a series of three reactors will be at a temperature of from about 115° to about 125° and the third reaction vessel of a series of three reactors will be at a temperature of from about 125° to about 150° C. The polymerization in such reaction vessel or series of reaction vessels will be for a time of from about 2 to about 6 hours and when two or three reaction vessels in series are used the time will generally be distributed fairly uniformly between each vessel, i.e. from about 1 to about 3 hours for each reaction vessel when two reaction vessels are used or from about 1 to about 2 hours for each reaction vessel when three reaction vessels are used. Such a polymerization process leads to the conversion of from about 60 to about 90 percent of the monomers. Following polymerization, the so-formed mixture is passed to a conventional devolatilization system which comprises a pre-heating means and a devolatilization vessel. Typically, the pre-heating means may be operated at a temperature of from about 220° to about 240° C., and serves to heat the mixture to about the aforestated temperature, the residence time in the pre-heating means not being critical but generally being within the range of from about 2 to about 5 minutes. The devolatilization vessel typically may be operated at a temperature of about 230° to about 260° C. and a pressure of from about 10 to about 40 mm of mercury and serves to remove residual monomers and inert diluent, if used. The product from the devolatilization vessel is recovered by conventional means such as, but not limited to, passage through an extruder to form pellets or strands of thermoplastic composition which are then cooled and packaged.

A further process of preparing the thermoplastic comprises a combination of bulk polymerization, as a pre-polymerization step, and of suspension polymerization. The feed mixture is supplied to an agitated reaction vessel and polymerized therein at a temperature of from about 75°, preferably about 80°, to about 95° C. for a time of from about 2 to about 7, preferably from about 4 to about 6, hours. Such polymerization leads to a conversion of from about 15 to about 35, preferably from about 25 to about 35, weight percent of the polymerizable monomers, in which at least some grafting of the monomers to the block copolymer occurs thereby developing small domains of block copolymer having monomers grafted thereto distributed through the matrix of polymerizing and polymerized monomers. The so-formed mixture is then suspended in water, preferably de-ionized, in the presence of a suspending agent. Suspending agents are well known in the art: partially hydrolyzed polyvinyl acetate is one example of a commercially available suspending agent. Typically, the amount of suspending agent that is used may be from about 0.07 to about 0.2 parts by weight per 100 parts by weight of water. Preferably, a buffering agent is also added to the suspension. Suitable buffering agents include sodium carbonate, sodium dihydrogen phosphate, disodium hydrogen phosphate and mixtures of sodium dihydrogen and disodium hydrogen phosphate. A preferred buffering agent is a mixture of sodium dihydrogen phosphate and disodium hydrogen phosphate to buffer the water phase to a pH of about 7. To the water suspension may also be added a polymer processing aid such as stearic acid or zinc stearate—zinc stearate is preferred in an amount of about 0.1 to about 0.3 percent by weight based on the feed mixture. Peroxidic and/or perester catalyst is also added to the suspension in an amount of from about 0.075 to about 0.4 percent by weight based on the feed mixture. Suitable peroxidic and perester catalysts include, but are not limited to, benzoyl peroxide, dicumyl peroxide, lauroyl peroxide, t-butyl hydroperoxide and t-butyl perbenzoate. Preferably, the catalyst is a mixture of a peroxide, such as benzoyl peroxide, and a perester, such as t-butyl perbenzoate, the amount of peroxide being from about 0.075 to about 0.4 percent by weight based on the feed mixture and the amount of perester being from about 0.05 to about 0.15 percent by weight based on the feed mixture.

The suspension is then passed to an agitated reactor and polymerization is continued therein in at least two steps. A first such step is at a temperature of from about 80° to about 100° C. for a time of from about 2 to about 5 hours and a second such step is at a temperature of from about 105° to about 130° C. for a time of from about 2 to about 6 hours. Preferably the polymerization is in three steps, the first step being at a temperature of from about 80° to about 100° C. for a time of from about 2 to about 5 hours, a second step being at a temperature of from about 105° to about 120° C. for a time of from about 1 to about 3 hours and a third step being at a temperature of from about 115° to about 130° C. for a time of from about 1 to about 4 hours. The polymer is then separated from the water phase and dried to remove residual water and devolatilized to remove residual monomers. Preferably, the polymer is dried in a hot air oven at a temperature of from about 75° to about 110° C. to remove the majority of the residual water and then devolatilized in a devolatilizing extruder at a temperature of from about 200° to about 250° C. to remove the majority of the residual monomers. The polymer is then cooled and packaged.

The novel thermoplastic composition produced by the present process has an unexpected excellent balance of properties including good toughness and strength properties, good elongation and a high degree of transparency. The polymer has good Izod impact strength and exhibits superior Gardner impact properties. The composition has good tensile strength characteristics which are not significantly affected by fats and oils which typically induce premature failure of many polymers in environmental stress crack testing for food applications. The polymer also has an acceptable heat deflection temperature and Vicat softening point. The thermoplastic composition has good processing characteristics, especially for the preferred compositions, and may be used in all types of fabrication equipment, including extrusion and injection molding. These properties combine to permit the composition to be used in a wide variety of end uses, and especially for packaging and for containers.

The following examples illustrate the scope of the invention, all parts being parts by weight unless other-

EXAMPLE 1

A series of polymerizations were run using the feed mixtures shown in Table I. The block copolymers used were: Block Copolymer 1 was KRATON ® 1101 which is a styrene-butadiene-styrene triblock copolymer having a styrene content of about 31 weight % and a molecular weight of about 113,000 and Block Copolymer 2 was STEREON ® 840 which is a styrene-butadiene tapered diblock copolymer having a styrene content of about 40 weight % and a molecular weight of about 85,000. The components of the feed mixture are in parts by weight. The feed mixture was prepared in a one gallon reactor equipped with an agitator and heating means. For Experiment No. 1, the feed mixture was polymerized for 4.6 hours at 86° C. The mixture was then transferred to a non-agitated vessel equipped with temperature control means and polymerization was continued for 2 hours at 85° C. and 3.2 hours at 168° C. Table I records the conditions for the other Experiments. Experiment Nos. 2 and 5 are controls using no block copolymer, and the products thereof have low elongations and are to be compared with the much higher elongations for the compositions of the invention and their overall improved balance of properties. The composition of the thermoplastic copolymers was essentially the same as that of the feed mixture.

EXAMPLE 2

A further series of polymerizations were run using the feed mixtures and polymerization conditions shown in Table II, each of the reactors being equipped with an agitator and with temperature control means. The block copolymers used were: Block Copolymer 3 was KRATON ® 1116, a linear three block copolymer containing about 21 weight percent of styrene and having a molecular weight of about 198,000, and Block Copolymer 4 was SOLPRENE ® 411, a radial block copolymer containing about 30 weight percent of styrene and having a molecular weight of about 225,000, with the butadiene portion having about 15 to 17 percent of vinyl 1,2 configuration. The devolatilization vessel was operated at about 25 mm pressure. The transmittance was determined on a 20 mil sheet using light having a wavelength of 6400 Å. The gel content was determined by measuring the percent insoluble content and the graft content is calculated in the conventional manner from $$\frac{\% \text{ gel} - \% \text{ block copolymer}}{100 - \% \text{ block copolymer}}$$

The environmental stress crack resistance test used a ⅛ inch specimen bent over a mandrel and placed in margarine at room temperature for one hour. The polymer compositions were essentially the same as that of the feed mixture. They exhibit a desirable overall excellent balance of properties.

TABLE I

| Experiment # | 1 | 2 | 3 | 4 | 5 |
|---|---|---|---|---|---|
| Styrene | 58.5 | 61.6 | 55 | 55 | 57.9 |
| Butyl acrylate | 15.9 | 16.7 | 17 | 17 | 17.9 |
| Methyl methacrylate | 20.6 | 21.7 | 23 | 23 | 24.2 |
| Block Copolymer 1 | — | — | 5 | 5 | — |
| Block Copolymer 2 | 5 | — | — | — | — |
| Polyethylene glycol dimethacrylate | 0.065 | 0.065 | — | 0.05 | 0.05 |
| Benzoyl peroxide | 0.1 | 0.1 | 0.07 | 0.07 | 0.07 |
| Di-tert-butyl peroxide | 0.05 | 0.05 | 0.06 | 0.06 | 0.06 |
| Stearic acid | 0.2 | 0.2 | — | — | — |
| Polymerization Conditions: Temperature/Time (°C./hr) | | | | | |
| −1 | 86/4.6 | 86/4.5 | 85/5.5 | 85/5.25 | 85/4.75 |
| C./hr) −2 | 85/5 | 86/4.8 | 85/5 | 85/5 | 89/5 |
| −3 | 168/3.2 | 168/4.9 | 167/5 | 167/5 | 167/5 |
| Prodct Properties: | | | | | |
| $M_w \times 10^{-3}$ | 440 | 499 | 252 | 396 | 400 |
| MFI g/10 min. | 0.83 | 3.4 | 5.7 | 1.3 | 5.4 |
| Heat deflection temp. °F. | 126 | 126 | 123 | 123 | 128 |
| Vicat softening temp. °F. | 156 | 153.5 | 155 | 154 | 152 |
| Tensile strength | | | | | |
| at yield psi | 6770 | 7120 | 6600 | 6680 | 7290 |
| at failure psi | 4080 | — | 4070 | 4070 | — |
| Elongation % | 31 | 2 | 38 | 33 | 2 |
| Izod Impact ft. lbs./in. | | | | | |
| milled | 0.4 | 0.4 | 0.4 | 0.5 | 0.3 |
| notched | 0.5 | 0.5 | 0.8 | 0.7 | 0.7 |
| Clarity | Clear | Clear | Clear | Clear | Clear |

TABLE II

| Experiment # | 6 | 7 | 8 | 9 | 10 |
|---|---|---|---|---|---|
| Styrene | 54.4 | 44.7 | 44.1 | 54.5 | 52.9 |
| Butyl acrylate | 16.9 | 19.2 | 19.1 | 16.8 | 16.2 |
| Methyl methacrylate | 22.7 | 31.6 | 30.9 | 22.7 | 22.2 |
| Block Copolymer 3 | — | 4.5 | 5.9 | — | — |
| Block Copolymer 4 | 6.0 | — | — | 6.0 | 8.7 |
| Benzoyl peroxide | 0.1 | 0.1 | 0.1 | 0.1 | 0.1 |
| Hindered phenol antioxidant | 0.1 | 0.1 | 0.1 | 0.1 | 0.1 |
| Tris-nonyl-phenyl phosphite | 0.3 | 0.3 | 0.3 | 0.3 | 0.3 |
| Ethylbenzene | 3 | 3 | 3 | 3 | 10 |

TABLE II-continued

| Experiment # | 6 | 7 | 8 | 9 | 10 |
|---|---|---|---|---|---|
| Polymerization Conditions: | | | | | |
| Temperature/Time °C./hr | | | | | |
| reactor 1 | 85/4 | 85/4 | 85/4 | 85/4 | 85/4 |
| reactor 2 | 110/1.5 | 110/1.5 | 110/1/5 | 114/1.5 | 115/1.5 |
| reactor 3 | 120/1.5 | — | — | — | — |
| reactor 4 | 135/1 | 130/1.5 | 130/1.5 | 130/1.5 | 131/2 |
| Monomer Conversion % molar | 65 | 69 | 67 | 67 | 61 |
| Devolatilization Conditions: | | | | | |
| Temperature/Time °C./hr | | | | | |
| pre-heater | 235/0.5 | 222/0.5 | 225/0.6 | 252/0.2 | 211/0.5 |
| vessel | 252/1 | 235/0.75 | 230/1 | 238/1 | 224/1 |
| Product Properties: | | | | | |
| $M_w \times 10^{-3}$ | 220 | 228 | 206 | 223 | 190 |
| MFI g/10 min. | 3.2 | 3.7 | 2.7 | 2.9 | 2.7 |
| Heat deflection temp. °F. | 134 | 126 | 128 | 133 | 138 |
| Vicat softening temp. °F. | 164 | 160 | 161 | 167 | 168 |
| Tensile strength | | | | | |
| at yield psi | 5860 | 6160 | 6330 | 6100 | 5670 |
| at failure psi | 4040 | 3790 | 3950 | 4210 | 3880 |
| Tensile modulus $\times 10^{-3}$ psi | 319 | 408 | 375 | 320 | 305 |
| Elongation % | 37 | 31 | 33 | 51 | 58 |
| Transmittance 20 mil at 6400A % | 90 | — | 90 | 90 | 90 |
| Izod Impact (milled) ft. lbs./in. | 0.8 | 0.5 | 0.5 | 0.7 | 0.6 |
| Gardner Impact in. lbs. | 14.3 | 3 | 3 | 8 | 4.7 |
| Gel content wt. % | 19.2 | 9.4 | 14.7 | 16.6 | 25.9 |
| Graft content wt. % | 13.5 | 4.4 | 8.1 | 10.1 | 16.9 |
| Environmental Stress Crack Resistance: | | | | | |
| Tensile strength at yield retained % | 96.5 | 96.9 | 100 | 100 | 93 |

EXAMPLE 3

The monomer mixture shown in Table III was bulk polymerized in a reactor equipped with an agitator and temperature control system. The so-formed mixture, in which about 25 to about 30 weight percent of the polymerizable monomers had been polymerized, was then suspended in water, catalysts, antioxidants and processing aid added as shown in Table III and polymerized in three stages as shown. The final polymerization of polymerizable monomers was about 99.5 weight percent. The polymer was recovered from the water, dried in a hot air oven, devolatilized in a devolatilizing extruder and recovered.

The properties of the two polymers are also shown in Table III.

TABLE III

| Experiment # | 11 | 12 |
|---|---|---|
| Styrene | 45 | 45 |
| Butyl acrylate | 8 | 11 |
| Methyl methacrylate | 37 | 34 |
| Block copolymer 4 | 10 | 10 |
| Benzoyl peroxide | 0.1 | 0.1 |
| Dodecyl mercaptan | 0.04 | 0.03 |
| Butyl benzyl phthalate | 0.2 | 0.2 |
| Polymerization | | |
| time (hours) | 5 | 5.4 |
| temperature (°C.) | 83 | 84 |
| Suspension system | | |
| Above product | 84 | 84 |
| Benzoyl peroxide | 0.16 | 0.16 |
| t-Butyl perbenzoate | 0.12 | 0.12 |
| Hindered phenol antioxidant | 0.1 | 0.1 |
| Tris-nonyl-phenyl phosphite | 0.3 | 0.3 |
| Zinc stearate | 0.03 | 0.03 |
| Water | 105 | 105 |
| Partially hydrolyzed polyvinyl acetate (5% in water) | 2.2 | 2.2 |
| Sodium carbonate | 0.006 | — |
| Polymerization | | |
| Step-1 Time (hours) | 4.5 | 4.5 |
| Step-1 Temperature (°C.) | 85 | 85 |
| Step-2 Time (hours) | 2 | 2 |
| Step-2 Temperature (°C.) | 111 | 110 |
| Step-3 Time (hours) | 3 | 3 |
| Step-3 Temperature (°C.) | 125 | 125 |
| Polymer Properties | | |
| $M_w \times 10^{-3}$ | 243 | 316 |
| MFI (g/10 min) | 0.3 | 0.5 |
| Heat deflection temperature (°F.) | 136 | 137 |
| Vicat softening temperature (°F.) | 184 | 174 |
| Tensile strength | | |
| at yield (psi) | 5480 | 4980 |
| at failure (psi) | 4940 | 4460 |
| Tensile modulus $\times 10^{-3}$ (psi) | 373 | 233 |
| Elongation (%) | 64 | 71 |
| Izod impact (milled) (ft.lbs./in.) | 2.2 | 2.2 |
| Gardner impact (in. lbs.) | 154 | 160 |
| Transmittance (%) 10 mil at 6400Å | 90+ | 90+ |
| Gel content (wt. %) | 24.7 | 22.6 |
| Graft content (wt. %) | 16.3 | 14.2 |
| Environmental Stress Crack Resistance | | |
| Tensile strength at yield (%) retained | 101.8 | 98.8 |

EXAMPLE 4

A series of bulk-suspension polymerizations was run, using a procedure similar to that of Example 3. The feed mixture was supplied to a reactor equipped with an agitator and temperature control means and polymerized for about 4.25 hours at 85° C. The so-formed mixture was then put into suspension, using 1750 g of the so-formed mixture, 1800 g of de-ionized water, 10.2 g of disodium hydrogen phosphate, 0.6 g of sodium dihydrogen phosphate, 41 ml of a 7% solution of partially hydrolyzed polyvinyl alcohol, 4.38 g of 70% benzoyl peroxide, 2.1 g of t-butyl perbenzoate and 1.75 g of antioxidant (Ethyl 330). The suspension was transferred to a reactor equipped with an agitator and temperature control means and polymerized for 2.5 hours at 85° C., 2 hours at 110° C. and 3 hours at 125° C. The polymer was recovered as described in Example 3. Table IV provides the details and the polymer properties—N.D. means that property was not measured. In Table IV, Experiment #18 is a control using butyl methacrylate instead of butyl acrylate. Block Copolymer 5 was STEREON ® 730 which is a tapered block styrene-butadiene copolymer having a styrene content of about 30 weight % and a molecular weight of about 180,000. By control of the composition and molecular weight, it is seen from Table IV that a wide range of useful properties can be achieved. The composition of the polymers was essentially the same as the composition of the feed mixture.

for a time of from about 2 to about 6 hours such that from about 60 to about 90 weight percent of the polymerizable monomers have been polymerized, passing the so-polymerized mixture to a devolatilization system comprising a devolatilization pre-heating means and a devolatilization vessel to remove unpolymerized monomers, to yield a thermoplastic composition.

2. The process of claim 1 wherein the feed mixture comprises styrene as monomer (a) in an amount of from about 35 to about 65 parts by weight, (b) in an amount of from about 8 to about 20 parts by weight, (c) in an amount of from about 15 to about 40 parts by weight and a block copolymer in an amount of from about 4 to about 12 parts by weight.

3. The process of claim 2 wherein the feed mixture also contains one or more organic free radical peroxide,

TABLE IV

| Experiment # | 13 | 14 | 15 | 16 | 17 | 18 | 19 | 20 |
|---|---|---|---|---|---|---|---|---|
| Styrene | 45 | 30 | 65.5 | 33.8 | 42.5 | 45 | 45 | 45 |
| Butyl acrylate | 10 | 13.3 | 14.5 | 30 | 9.5 | — | 10 | 10 |
| Butyl methacrylate | — | — | — | — | — | 10 | — | — |
| Methyl methacrylate | 35 | 46.7 | 10 | 26.2 | 33 | 35 | 35 | 35 |
| Block copolymer 4 | 10 | 10 | 10 | 10 | 15 | 10 | — | 10 |
| Block copolymer 5 | — | — | — | — | — | — | 10 | — |
| Butyl benzyl phthalate | 0.5 | 0.5 | 0.5 | 0.5 | 0.5 | 0.5 | 0.5 | 0.5 |
| Dodecyl mercaptan | 0.05 | 0.05 | 0.05 | 0.05 | 0.05 | 0.05 | 0.05 | 0.1 |
| Benzoyl peroxide (70%) | 0.14 | 0.14 | 0.14 | 0.14 | 0.14 | 0.14 | 0.14 | 0.14 |
| Polymer Properties | | | | | | | | |
| $M_w \times 10^{-3}$ | 238 | 275 | ND | 189 | 175 | 237 | 205 | 253 |
| MFI g/10 min | 1.38 | 0.42 | 8.1 | 18.2 | 0.62 | 0.5 | 0.28 | 3.1 |
| Vicat softening temp. °F. | 176 | 170 | 160 | 130 | 172.5 | 195 | 176 | 174 |
| Heat deflection temp. °F. | 139 | 131 | ND | ND | 134 | 149 | 133 | 136 |
| Tensile strength | | | | | | | | |
| at yield psi | 4550 | 4470 | ND | ND | 2750 | 5120 | 4160 | 3900 |
| at failure psi | 4110 | 4170 | ND | ND | 3820 | 4800 | 4485 | 4220 |
| Tensile modulus $\times 10^{-3}$ psi | 269 | 314 | ND | ND | 150 | 340 | 343 | 267 |
| Elongation % | 77 | 77 | ND | ND | 114 | 82 | 104 | 83 |
| Izod impact (milled) ft. lbs | 1.95 | 1.64 | ND | ND | 2.12 | 2.1 | 2.51 | 1.44 |
| Gardner impact in. lbs. | 83 | 150 | ND | ND | 29 | 21 | 28 | 36 |
| Transmittance$^x$ % | 89 | 86.8 | 83.1 | 89.8 | 88.5 | 89.9 | 88.4 | 89.6 |
| Haze$^x$ % | 18.1 | 40.2 | 99.9 | 21.7 | 19.3 | 16.7 | 13.1 | 19 |
| Yellow Index$^x$ % | 3.1 | 8.8 | 9.1 | 2.8 | 3.6 | 2.4 | 2.5 | 2.5 |
| Gel Content wt. % | 21.7 | 22.6 | 23.4 | 27.3 | 31.3 | 20.5 | 20.8 | 21.3 |

$^x$compression molded sample

I claim:

1. A process for the preparation of a thermoplastic composition having good toughness and strength properties and a high degree of transparency, which process comprises the step of providing a feed mixture comprising (a) from about 25 to about 75 parts by weight of a styrenic monomer selected from the group consisting of styrene, p-methyl styrene, tertiary butyl styrene, dimethyl styrene and the nuclear brominated or chlorinated derivatives thereof, (b) from about 7 to about 30 parts by weight of butyl acrylate, (c) from about 10 to about 50 parts by weight of methyl methacrylate and from about 2 to about 20 parts by weight of a block copolymer selected from the group consisting of diblock and triblock copolymers of styrene-butadiene, styrene-butadiene-styrene, styrene-isoprene, styrene-isoprene-styrene, partially hydrogenated styrene-butadiene-styrene and partially hydrogenated styrene-isoprene-styrene linear or radial block copolymers having a weight average molecular weight of not less than about 75,000 and a styrene content of from about 20 to about 50 weight percent, for a total of 100 parts by weight of said feed mixture, subjecting said feed mixture to polymerization in (i) an agitated reaction vessel at about 80° to about 100° C. for a time of from about 3 to about 6 hours and (ii) at least one and up to five further reaction vessels in series at about 100° to about 160° C. hydroperoxide or perester catalyst sources, one or more antioxidants and an inert hydrocarbon reaction diluent in an amount up to 5 parts by weight per 100 parts by weight of said feed mixture.

4. The process of claim 1 wherein the thermoplastic composition contains from about 8 to about 30 weight percent of gel.

5. The process of claim 1 wherein the thermoplastic composition contains gel in an amount of from about 1.5 to about 4 times the block copolymer content of said thermoplastic composition.

6. The process of claim 1 wherein the feed mixture is supplied from the first reaction vessel to a series of two reaction vessels operated at temperatures of from about 105° to about 120° C. and from about 125° to about 150° C.

7. The process of claim 1 wherein the feed mixture supplied from the first reaction vessel to a series of three reaction vessels operated at temperatures of from about 105° to about 120° C., from about 115° to about 125° C. and from about 125° to about 150° C.

8. The process of claim 2 wherein the block copolymer of the feed mixture is a triblock styrene-butadiene-styrene or styrene-isoprene-styrene copolymer having a molecular weight of not less than about 175,000 and not more than about 275,000.

* * * * *